United States Patent [19]

Szymanis et al.

[11] 4,306,404
[45] Dec. 22, 1981

[54] RECTIFIER ASSEMBLY FOR A LAWN MOWER

[75] Inventors: Edward Szymanis, Midhurst; William E. Heap, Barrie, both of Canada

[73] Assignee: Canadian General Electric Company Limited, Toronto, Canada

[21] Appl. No.: 163,440

[22] Filed: Jun. 27, 1980

[30] Foreign Application Priority Data

Feb. 7, 1980 [CA] Canada .................................. 345256

[51] Int. Cl.³ .......................................... A01D 75/00
[52] U.S. Cl. .................................................. 56/10.5
[58] Field of Search .......................... 56/10.5; 361/388

[56] References Cited

U.S. PATENT DOCUMENTS 2,941,346  6/1960  Perry ..................................... 56/10.5
3,375,338  3/1968  Delf ...................................... 56/10.5

Primary Examiner—Jay N. Eskovitz
Attorney, Agent, or Firm—Raymond A. Eckersley

[57] ABSTRACT

An electric lawn mower having a permanent magnet motor and a dynamic braking feature includes a rectifier which is assembled in a switch-box. The novel arrangement of the rectifier in the switch-box assembly is attached to an upper portion of the handle of the mower to permit use of standard three wire cord for connection between the switch-box and the motor.

5 Claims, 1 Drawing Figure

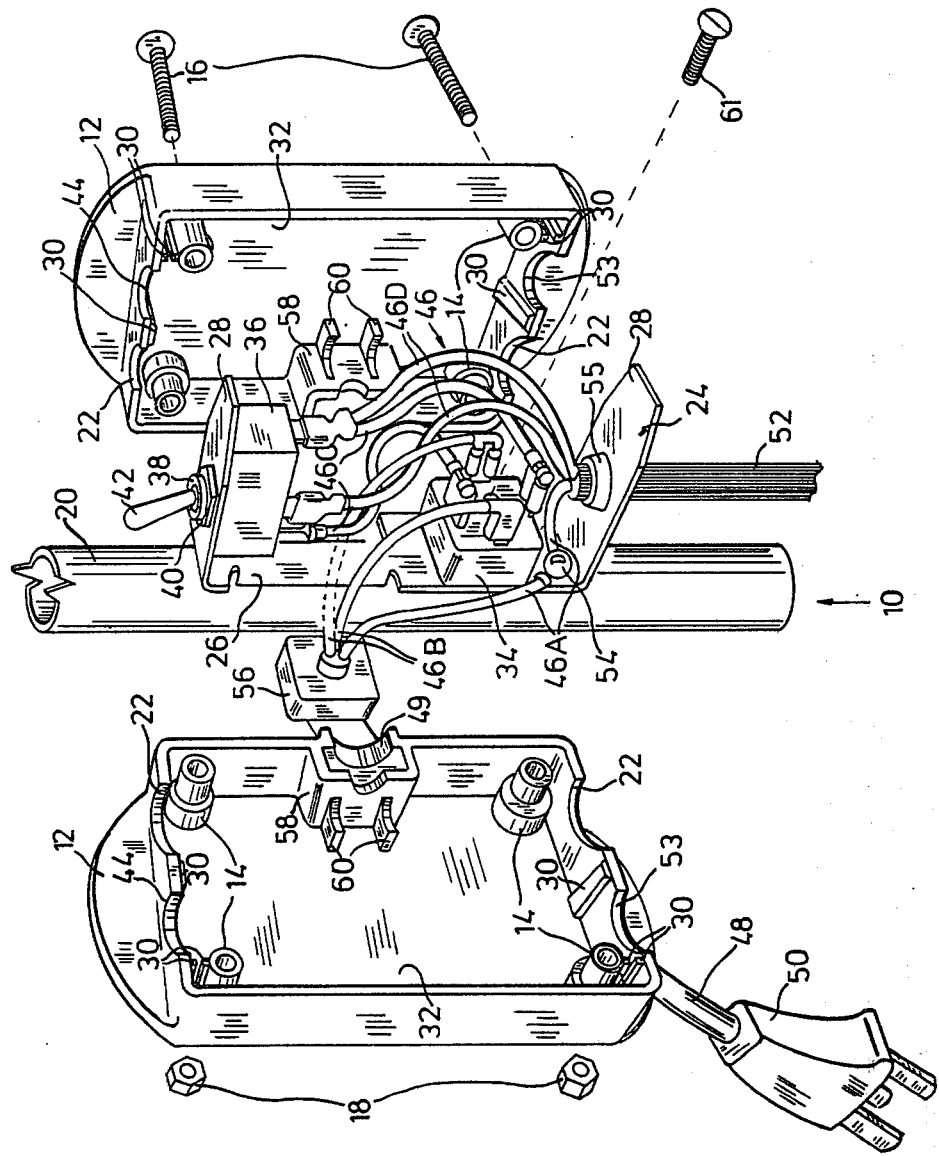

RECTIFIER ASSEMBLY FOR A LAWN MOWER

This invention relates to a switch-box assembly for use with a lawn mower having a permanent magnet motor and a dynamic braking feature.

In the construction of a lawn mower it is common practice to provide a switch to control the operation of the electric motor of the mower. The switch is usually enclosed within a switch-box assembly located on a handle portion of the mower having easy access thereto by a human operator. A permanent magnet motor is one type of motor presently being used in a lawn mower. When a permanent magnet motor is employed it requires a rectifier to convert electrical energy from alternating current to direct current. The rectifier is usually located on the motor casing or in the motor itself resulting in rather complex wiring between the switch and motor to provide a dynamic braking function. To date, the manner in which to accomplish the complex switching function is to use a non-standard heavy duty six wire electrical cord between the switch-box and rectifier of the motor. The six wire electrical cord is relatively less available and more expensive than the standard three wire electrical cord. The extra expense and poor availability of six wire cord can be better appreciated when one considers that each lawn mower requires three to four feet of six wire cord and that tens of thousands of mowers are manufactured annually. Also, the six wire cord results in an increased number of electrical connections on the deck of the mower which connections may become dangerous.

It is therefore an object of the present invention to provide a novel switch-box assembly that eliminates the need to employ a six wire electrical cord to accomplish the dynamic braking function.

The present invention relates to a switch-box assembly for a lawn mower where the rectifier of the mower is located in the housing of the switch-box assembly.

By locating the rectifier in the housing of the switch-box assembly, electrical energy may be supplied to and carried from the assembly by three wire electrical cord. The present invention, by permitting the use of standard three wire electrical cord, takes advantage of the relatively lower cost of the three wire cord.

In accordance with a broad aspect of the present invention there is provided a switch-box assembly operable for use with a lawn mower having a permanent magnet motor, comprising a housing operably to be mounted to the mower remote from the motor, a switch supported in the housing for controlling the operation of the motor, and a rectifier supported in the housing for converting electrical energy passing through the switch to the motor from an alternating current to a direct current.

For a better understanding of the nature and objects of the present invention, reference may be had by way of example to the sole FIGURE of diagrammatic drawings, which figure is an exploded view of the switch-box assembly as disclosed herein.

Referring to the figure the preferred embodiment of the switch-box assembly 10 is now described.

Switch-box assembly 10 comprises a housing 12 shown split into two identical sub-sections. Housing 12 is provided with insulating bushings 14 which insulate screws 16 passing therethrough from electrical components located within housing 12. Screws 16 are secured in place by nuts 18 which mount housing 12 about tubular handle 20. Handle 20 consists of a handle portion of the lawn mower (not shown) which is remote from the permanent magnet motor of the mower. Housing 12 is provided with a first pair of aligned cut-outs 22 through which handle 20 passes.

A support means comprising a U-shaped metal bracket 24 is mounted to handle 20 by means of one or more spot welds in the area of its base portion 26 such that base portion 26 lies flush against handle 20. Bracket 24 has two arms 28 extending outwardly from the base portion 26. Arms 28 locate and carry ribs 30 which extend into the interior of the housing 12 from walls 32 of the housing 12. Rectifier 34 is secured to bracket 24 by screw 61, as shown, and is in heat transfer relation with handle 20. In other words, handle 20 acts as a heat sink for rectifier 34. Switch 36 is shown supported to upper arm 28 of bracket 24. Upper arm 28 is provided with an aperture through which threaded hollow stud 38 passes. Nut 40 shown tightened about stud 38 secures switch 36 in position as shown. Switch 36 is provided with a movable lever 42 which passes through upper cut-out 44 of the housing 12 so as to be accessible to a human operator. Wires generally designated 46 are connected as shown to carry electrical energy from three wire power supply cord 48 through rectifier 34 and switch 36 and out through three wire motor cord 52, which is connected to the motor of the lawn mower. Screw 54 fastened to base portion 26 of bracket 24 grounds wires 46A to handle 20.

The lower arm 28 of bracket 24 is provided with an aperture through which motor cord 52 passes. A strain relief member 55 counters any forces acting against cord 52. Cord 52 passes through lower cut-outs 53 of housing 12.

Supply cord 48 passing through cut-out 49 of housing 12 is also provided with a strain relief member 56 which is housed in sub-housing 58 of housing 12. Sub-housing 58 has clamping arms 60 which surround handle 20 to help mount housing 12 to handle 20.

In operation, switch-box assembly 10 controls electrical energy passing therethrough to the motor of the mower. Electrical energy is supplied by power cord 48 when plug 50 is inserted into an electrical supply. Energy from cord 48 is carried first by wires 46B to rectifier 34 where the energy is converted from alternating current to direct current. The energy is then carried from rectifier 34 to switch 36 by wires 46C shown interconnected therebetween. Assuming switch 36 to be in its closed position, energy passes through switch 36 along wires 46D and out switch-box assembly 10 to the motor by motor cord 52. By manually moving lever 42, switch 36 is movable from its closed position into its open position, precluding passage of electrical energy therethrough to the motor.

It will be appreciated that alternate embodiments for the present invention will be readily apparent to a man skilled in the art in light of this disclosure. For example, should the motor be grounded to the deck of the lawn mower, then a two wire electrical cord from the switch-box to the motor will suffice. Accordingly the present invention should be limited only to that which is claimed in the accompanying claims.

What I claim as new and desire to secure by Letters Patent of the United States is:

1. In a lawn mower having a handle and permanent magnet motor, the improvement comprising a switch-box assembly having a housing mounted to said handle remote from said motor, a switch supported in said housing for controlling the operation of said motor, a rectifier supported in said housing for converting electrical energy passing through said switch to said motor from an alternating current to a direct current, said switch and said rectifier being mounted to a U-shaped bracket, said bracket being mounted to said handle and carrying ribs extending into the housing from the walls of said housing.

2. The assembly of claim 1 wherein electrical energy supplied from said assembly to said motor is carried by electrical cord selected from the group consisting of two wire or three wire electrical cord.

3. The assembly of claim 1 wherein said bracket has a base portion thereof lying flush against said handle portion to locate said rectifier in heat transfer relation with said handle portion.

4. The assembly of claim 3 wherein said assembly is operable to be grounded to said handle portion by said bracket abutting said handle portion.

5. In a lawn mower having a handle and a permanent magnet motor and providing a dynamic braking function, the improvement comprising a switch-box assembly having a housing mounted to said handle remote from said motor, support means in said housing supporting a switch in said housing such that a lever of said switch is accessible from outside said housing to control passage of electrical energy through the switch to the motor, said support means further supporting a rectifier in said housing which is connected in electrical series relation with said switch to convert the electrical energy passing through said switch to said motor from an alternating current to a direct current, said support means comprising a U-shaped metal bracket having its arms supporting ribs extending into the housing from the walls of the housing, said bracket having its base portion mounted to said handle by means of one or more spot welds such that said base portion lies flush against said handle with said rectifier in heat transfer relation with said handle, and three wire electrical cord passing into and out of said housing for respectively carrying electrical energy to the assembly and from the assembly to the motor.

* * * * *